United States Patent
Winkles et al.

(10) Patent No.: US 7,245,613 B1
(45) Date of Patent: Jul. 17, 2007

(54) ARRANGEMENT IN A CHANNEL ADAPTER FOR VALIDATING HEADERS CONCURRENTLY DURING RECEPTION OF A PACKET FOR MINIMAL VALIDATION LATENCY

(75) Inventors: Joseph Winkles, Austin, TX (US); Joseph A. Bailey, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1008 days.

(21) Appl. No.: 10/107,150

(22) Filed: Mar. 28, 2002

(51) Int. Cl.
*G06F 11/00* (2006.01)
*H04L 12/56* (2006.01)
*H04L 12/28* (2006.01)

(52) U.S. Cl. .................. 370/365; 370/392; 370/463
(58) Field of Classification Search ............. 370/252, 370/389, 392, 401
See application file for complete search history.

(56) References Cited

U.S. PATENT DOCUMENTS

| | | | |
|---|---|---|---|
| 6,260,167 B1 | 7/2001 | Lo et al. | |
| 6,675,325 B1* | 1/2004 | Garney et al. | 714/43 |
| 6,898,752 B2* | 5/2005 | Tucker | 714/752 |
| 6,948,004 B2* | 9/2005 | Gasbarro et al. | 709/250 |
| 6,959,020 B1* | 10/2005 | Hourunranta et al. | 370/542 |
| 6,987,761 B2* | 1/2006 | Bunce et al. | 370/389 |
| 7,180,893 B1* | 2/2007 | Sindhu et al. | 370/392 |
| 2003/0169738 A1* | 9/2003 | McDaniel | 370/392 |
| 2004/0062244 A1* | 4/2004 | Gil et al. | 370/392 |

FOREIGN PATENT DOCUMENTS

JP           405063756 A  *   3/1993

OTHER PUBLICATIONS

Infiniband Specification, vol. 1 & 2, Release 1.0.a, Jun. 19, 2001, (http://www.infinibandta.org/specs/register/publicspec/past/).*
Infiniband Architecture Specification vol. 1, Release 1.0, Oct. 24, 2000, pp. 141-142 & 185-187.*
Cassiday et al., "Hot Chips", *InfiniBand™ Architecture Tutorial*, Aug. 2000, pp. 1-79, InfiniBand™ Trade Association.
Hartmann, "Using The VIEO InfiniBand™ Channel Abstraction Layer (CAL)", *Channel Abstraction Layer (CAL)*, Jan. 2002, pp. 1-19, VIEO, Inc.

(Continued)

*Primary Examiner*—Kwang Bin Yao
*Assistant Examiner*—Warner Wong
(74) *Attorney, Agent, or Firm*—Manelli Denison & Selter PLLC; Leon R. Turkevich

(57) ABSTRACT

A channel adapter includes a link receive resource configured for initiating packet validation upon detecting a receive counter reaching a prescribed threshold corresponding to reception of an initial header of a data packet. Upon initiating packet validation, the link receive resource determines whether the initial header includes any errors. Any errors detected in the initial header are stored if the errors are detected prior to reception of an end of the data packet. Additional validation operations can be initiated upon reception of the respective headers. Upon receiving the end of the data packet, the link receive resource selectively reports the errors detected in the initial header based on whether any higher-priority error is detected relative to a prescribed error reporting order.

18 Claims, 4 Drawing Sheets

OTHER PUBLICATIONS

Kadambi et al., *Gigabit Ethernet, Migrating to High-Bandwidth LANs*, 1998, pp. 99-100 and 204-206, Prentice Hall PTR, Upper Saddle River, NJ.

AMD, "Pcnet™—*FAST*+ Enhanced 10/100 Mbps PCI Ethernet Controller with OnNow Support", Am79C972, Publication # 21485, Dec. 1999, pp. 1-236.

AMD, "NetPHY™-1 1/100 Mbps Ethernet Physical Layer Single-Chip Transceiver with 100BASE-FX Support", Am79C873, Publication ™ 22164, Feb. 1999, pp. 1-44.

* cited by examiner

ARRANGEMENT IN A CHANNEL ADAPTER FOR VALIDATING HEADERS CONCURRENTLY DURING RECEPTION OF A PACKET FOR MINIMAL VALIDATION LATENCY

BACKGROUND OF THE INVENTION

1. Field of the Invention

The present invention relates to a channel adapter configured for validating received packets in an InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, availability, and serviceability.

In addition, processors used in servers have encountered substantial improvements, where the microprocessor speed and bandwidth have exceeded the capacity of the connected input/output (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between end nodes (e.g., central processing units, peripherals, etc.) and switches inside a server system. Hence, the term "InfiniBand™ network" refers to a private system area network (SAN) that connects end nodes and switches into a cluster within a server system, enabling the sharing of cluster resources. The InfiniBand™ Architecture Specification specifies both I/O operations and interprocessor communications (IPC).

A particular feature of the InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading" processor code execution), hence offloading the operating system of the server system.

However, arbitrary hardware implementations may result in substantially costly or relatively inefficient hardware designs. For example, the InfiniBand™ Architecture Specification specifies that a packet must be validated in the link layer of channel adapters to ensure that the packet is at the correct destination, is not corrupted with bit errors, etc. In particular, the InfiniBand™ Architecture Specification indicates that data packets must be checked with detected errors reported in a prescribed sequence, beginning with a cyclic redundancy check (CRC) using the CRC field at the end of the packet. Although the InfiniBand™ Architecture Specification permits validation to begin before the entire packet has been received, the InfiniBand™ Architecture Specification also specifies that if the channel adapter has begun to forward (e.g., in a router or a switch) packet data before the entire packet has been received, the channel adapter implemented within the switch or router must corrupt the packet if an error is detected subsequent to the switch or router having begun forwarding the packet.

No proposal has been made for an efficient manner for implementing packet validation before the entire packet has been received; hence, there is a concern that an inefficient implementation may result in more complex implementations increasing device cost, or implementations that increase latency. In addition, there is a concern that the intentional corrupting of a packet due to detecting an error subsequent to initiating forwarding of the packet results in an unnecessary depletion of system resources such as network bandwidth.

SUMMARY OF THE INVENTION

There is a need for an arrangement that enables a channel adapter to be implemented in an efficient and economical manner.

There also is a need for an arrangement that enables a channel adapter to initiate packet validation for packet data before an entire packet has been received, without the necessity of corrupting the packet due to detection of errors subsequent to initial processing of the packet data.

These and other needs are attained by the present invention, where a channel adapter includes a link receive resource configured for initiating packet validation upon detecting a receive counter reaching a prescribed threshold corresponding to reception of an initial header of a data packet. Upon initiating packet validation, the link receive resource determines whether the initial header includes any errors. Any errors detected in the initial header are stored if the errors are detected prior to reception of an end of the data packet. Additional validation operations can be initiated upon reception of the respective headers. Upon receiving the end of the data packet, the link receive resource selectively reports the errors detected in the initial header based on whether any higher-priority error is detected relative to a prescribed error reporting order.

Hence, packet validation can be initiated as the packet data is received with minimal complexity. In addition, packet validation can be initiated before reception of the end of the data packet, without the necessity of generating a corrupt packet due to a detected error.

One aspect of the present invention provides a method in a channel adapter. The method includes resetting a counter in response to detecting a start data packet delimiter for a data packet, and incrementing the counter for each received byte of the data packet. The method also includes initiating packet validation in response to the counter reaching a prescribed threshold corresponding to reception of an initial header of the data packet, the initiating step including determining whether the initial header includes any errors, and selectively reporting the errors detected in the initial header, upon reception of an end of the data packet, based on whether a higher-priority error is detected relative to a prescribed error reporting order.

Another aspect of the present invention provides a channel adapter. The channel adapter includes a link interface configured for receiving a data packet, and a link receive resource. The link interface is configured for receiving a data packet, and the link receive resource has a counter configured for counting each received byte of a data packet. The link receive resource is configured for resetting the counter in response to detecting a start data packet delimiter for the data packet, and initiating packet validation for determining whether an initial header includes any errors in response to the counter reaching a prescribed threshold corresponding to reception of the initial header of the data packet. The link receive resource is configured for selectively reporting the errors detected in the initial header, upon reception of an end of the data packet, based on whether a higher-priority error is detected relative to a prescribed error reporting order.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
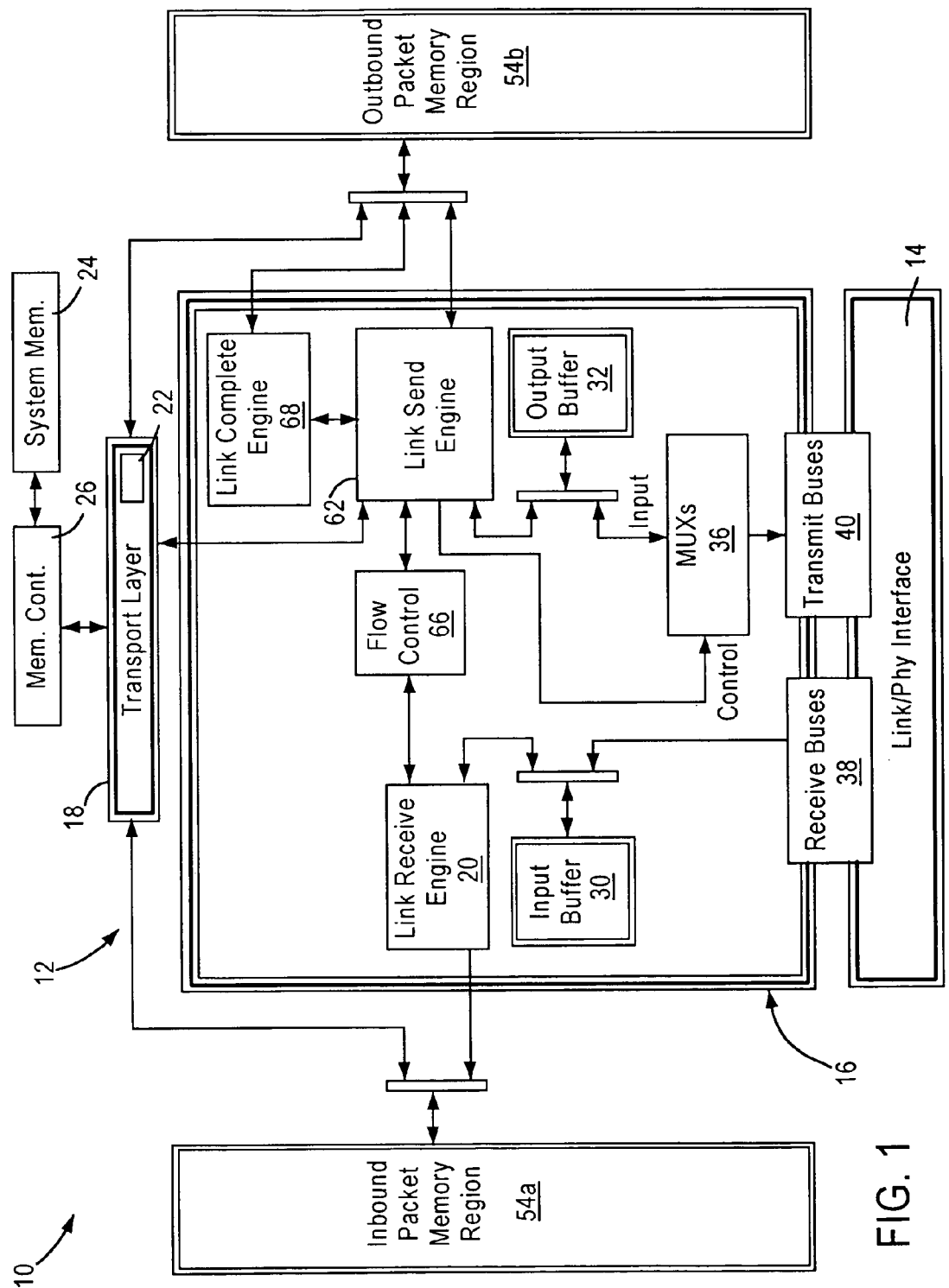
FIG. 1 is a diagram illustrating an InfiniBand™ channel adapter configured for initiating validation of a data packet upon receipt of an initial local route header, according to an embodiment of the present invention.

FIG. 1 is a block diagram illustrating a network node 10 having an InfiniBand™ channel adapter 12 configured for sending and receiving data packets according to Infini-Band™ protocol, according to an embodiment of the present invention. The channel adapter 12, implemented for example as a host channel adapter (HCA) or target channel adapter (TCA) and compliant with the InfiniBand™ Architecture Specification, is implemented in a manner that enables data packets received from the InfiniBand™ network to be validated in a manner that minimizes validation latency. In particular, the channel adapter 12 includes a link interface 14 configured for sending and receiving a data packet onto an InfiniBand™ network, a link layer module 16, and a transport layer module 18. The link layer module 16 includes a link receive engine 20, also referred to as a link receive resource, configured for initiating link layer validation operations upon reception of the link layer header, referred to in the InfiniBand™ Architecture Specification as the local route header (LRH).

The transport layer module 18 includes a transport layer receive resource 22 configured for initiating transport layer validation operations upon reception of the transport layer header, referred to in the InfiniBand™ Architecture Specification as the base transport header (BTH). As described below with respect to FIG. 4, the transport layer receive resource 22 is configured for fetching queue pair context information from the system memory 24 via a memory controller 26 in response to reception of the base transport header. Hence, latency is minimized based on fetching the queue pair context information from system memory 24 as the data packet is received. Any errors detected by either the link receive engine 20 or the transport layer receive resource 22 are stored locally until the link receive engine 22 receives the CRC field at the end of the data packet for CRC validation.

As illustrated in FIG. 1, the link layer module 16 also includes an input buffer 30, an output buffer 32, a multiplexer circuit 36, a receive bus 38, and a transmit bus 40. The link layer module 16 also includes a link send engine 62, a flow control module 66, and a link complete engine 68. The channel adapter 12 also includes a local memory 54 for storage of transmit data and receive data. In particular, transmit packets to be output onto the InfiniBand™ network are output by the transport layer 18 to an outbound packet memory region 54b, and receive data from the InfiniBand™ network is stored in an inbound packet memory region 54a by the link layer module 16.

The link send engine 62 is configured for managing link layer operations associated with transmitting data packets, according to the InfiniBand™ specification. The link send engine 62 also includes a virtual lane arbitration module configured for performing virtual lane arbitration, for example weighted round robin arbitration. The virtual lane (VL) arbitration module is implemented as a state machine with registers, and is configured for managing the servicing of the virtual lanes. The VL arbitration module also determines which virtual lane to service, in what order, and for what duration (e.g., based on bandwidth considerations, internal buffer capacity, flow control credits or combination thereof). The establishment and tear down of virtual lanes is managed by the link complete engine 68.

The link complete engine 68 is configured for preparing packets for transmission, for example by constructing a local routing header (LRH), calculating a cyclic redundancy check (CRC) value for the packet, and appending the LRH and CRC fields to the packets.

The link layer module 16 outputs the transmit packets according to a credit-based flow control managed by the flow control module 66. In particular, the flow control module 66 monitors the available credits for transmission of a transmit packet on the assigned virtual lane. In particular, credits are sent on a per virtual lane basis, where a receiver issues a credit based on packets taken from an incoming virtual lane buffer; the credits are sent to the sender, enabling the sender to manage flow control. Hence, if the flow control module 66 determines that an identified virtual lane has an insufficient number of credits, the flow control module 66 sends an instruction to the link send engine 62 to defer transmission on the corresponding virtual lane until a sufficient number of credits have been received.

The output buffer 32 and the input buffer 30 each are implemented, for example, as first in first out (FIFO) buffers. The output buffer 32 is configured for buffering transmit data, including payload data retrieved from the outbound memory buffer 54b, following link layer processing by the link send engine 62. The outbound memory buffer 54b includes multiple internal buffers assigned to the respective virtual lanes.

The multiplexer 36, controlled by the link send engine 62, is used to select a link width of the port. In particular, the multiplexer 36 is used to enable selection of 1×, 4×, and 12× link widths according to the InfiniBand™ Specification.

Figure 2:
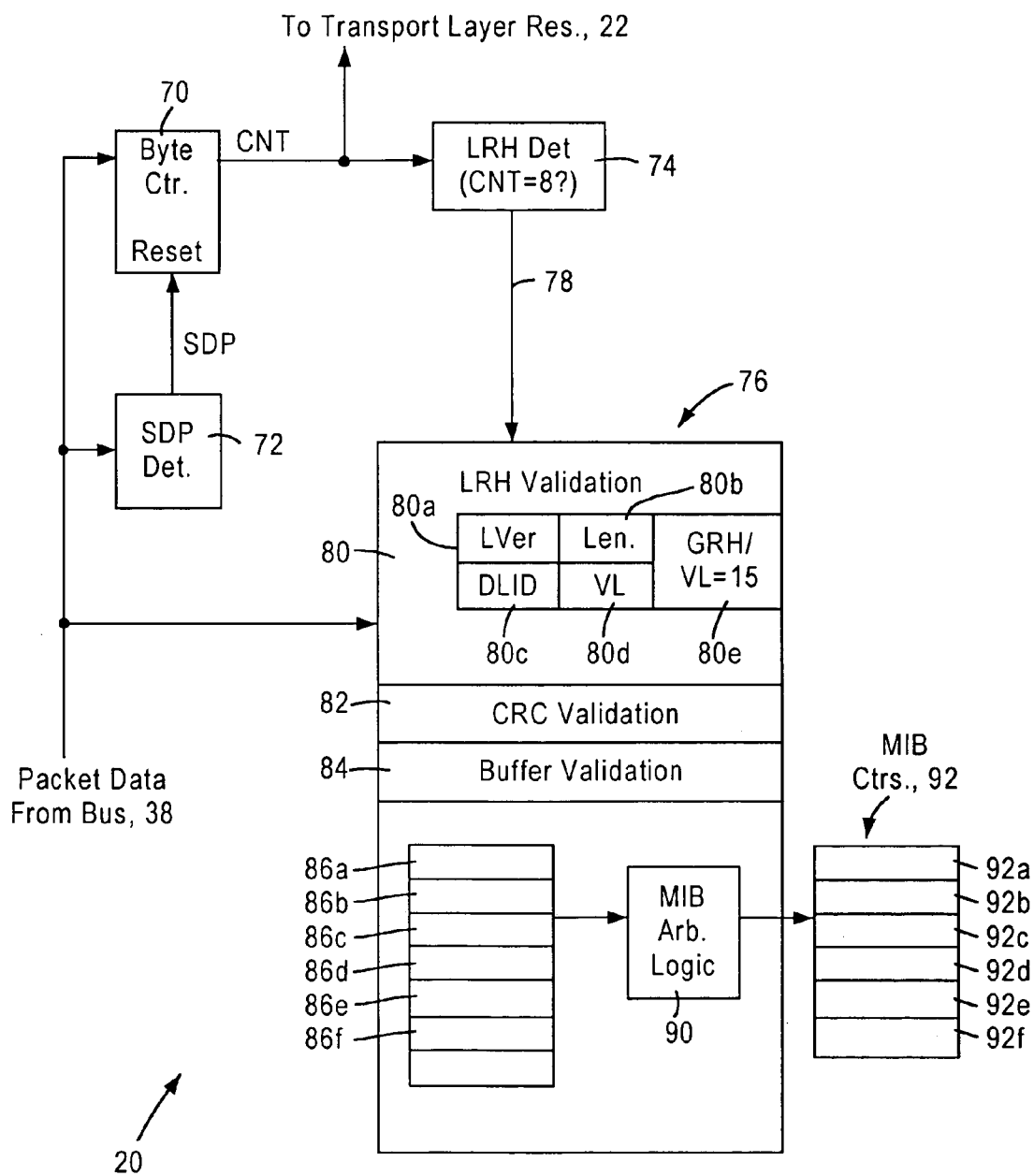
FIG. 2 is a diagram illustrating in detail the link receive resource of FIG. 1.

FIG. 2 is a diagram illustrating in detail the link receive engine 20 according to an embodiment of the present invention. The link receive engine includes a counter 70, also referred to as a bytes received counter, configured for counting each received data byte of a received data packet as the data byte is received on the receive bus 38. The link receive engine also includes a detector 72 configured for detecting a start data packet delimiter (SDP) within the data stream from the receive bus 38, and outputting a reset signal to the counter 70 in response to detecting the start data packet delimiter. The link receive engine 20 also includes a local route header detector 74, and a validation resource 76.

Figure 3A:
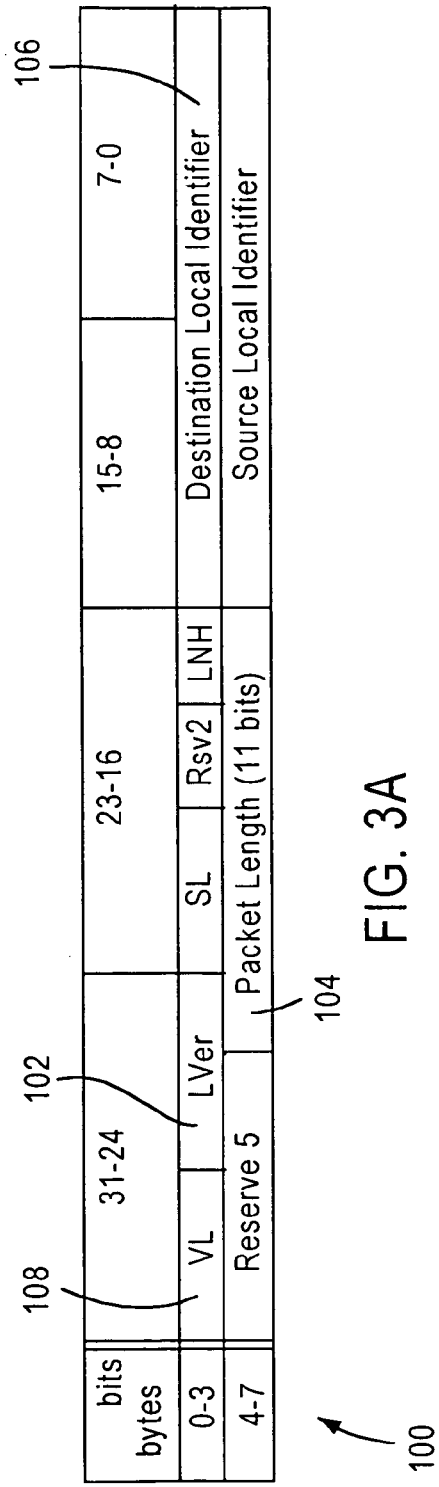
FIGS. 3A and 3B are diagrams illustrating a local route header and a base transport header of a received data packet, respectively.

The local route header detector 74 is configured for outputting a begin validation signal 78 to the validation resource 76 in response to detection of the local route header 100 as illustrated in FIG. 3A, namely when the counter value of the counter 70 reaches the value of 8 bytes, corresponding to the end of the local route header relative to the start data packet delimiter.

The validation resource 76 includes local route header validation logic 80, CRC validation logic 82, buffer validation logic 84, and latches 86. The local route header validation logic 80 is configured for initiating local route header validation operations in response to the begin validation signal 78, and the buffer validation logic 84 is configured for determining the availability of buffer space within the input buffer 30 in response to the begin validation signal 78. The CRC validation logic 82 checks for CRC errors once the entire packet is received. The local route header validation logic 80 is configured for detecting whether an error exists within a link version (LVer) field 102, a packet length field 104, the destination local identifier field 106, a virtual lane field 108, and whether a global route header is present if the virtual lane field has a value of 15: detected errors in these fields causes error bits to be set in the latches 86a, 86b, 86c, 86d, 86e, respectively. A bit is set in the latch 86f if the buffer validation logic 84 determines that the input buffer 30 is in an overflow condition, and a bit is set in latch 86g if a CRC error is detected.

The validation resource 76 also includes a management information base (MIB) arbitration module 90 configured for determining which of the available error counters 92, also referred to as MIB counters, should be incremented based on the relative priority of the errors as specified by the InfiniBand™ Architecture Specification: the order of reporting errors, in order of decreasing priority, is CRC check 92a, link version check 92b, packet length check 92c, destination local identifier check 92d, virtual lane check 92e, and determining whether a global route header is present if the virtual lane is 15 92f. Hence, if all of the above errors are detected, except for an absence of a CRC error, the MIB arbitration module 90 would only increment the MIB counter 92b associated with the link version check.

Figure 3B:
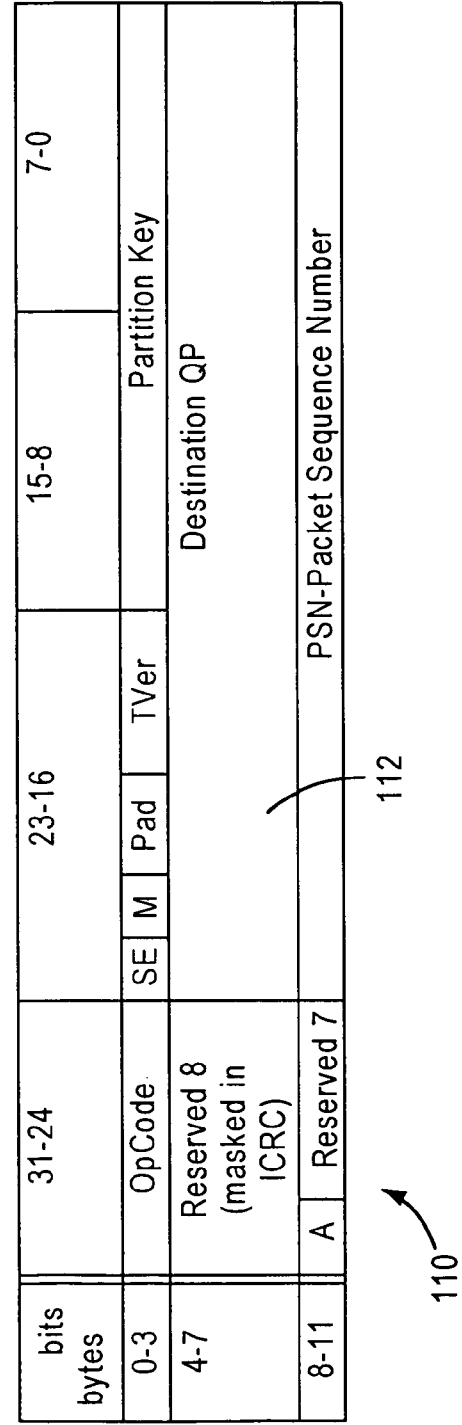

FIG. 3B illustrates a base transport header 110 that follows the local route header 100. As specified by the InfiniBand™ Architecture Specification, the 12 bytes following the local route header include the base transport header 110; hence, the transport layer receive resource 22 is able to detect the reception of the base transport header 110 based on the counter 70 reaching a value of 20 bytes when no global route header (GRH) is present, or 60 bytes when the GRH is present. The link layer can determine the presence of the GRH based on parsing the link next header (LNH) field in the LRH. In response to the counter reaching the end of the BTH, the transport layer receive resource 22 initiates transport layer validation, including retrieving queue pair information from the system memory 24, based on the queue pair value 112 specified within the base transport header 110.

Figure 4:
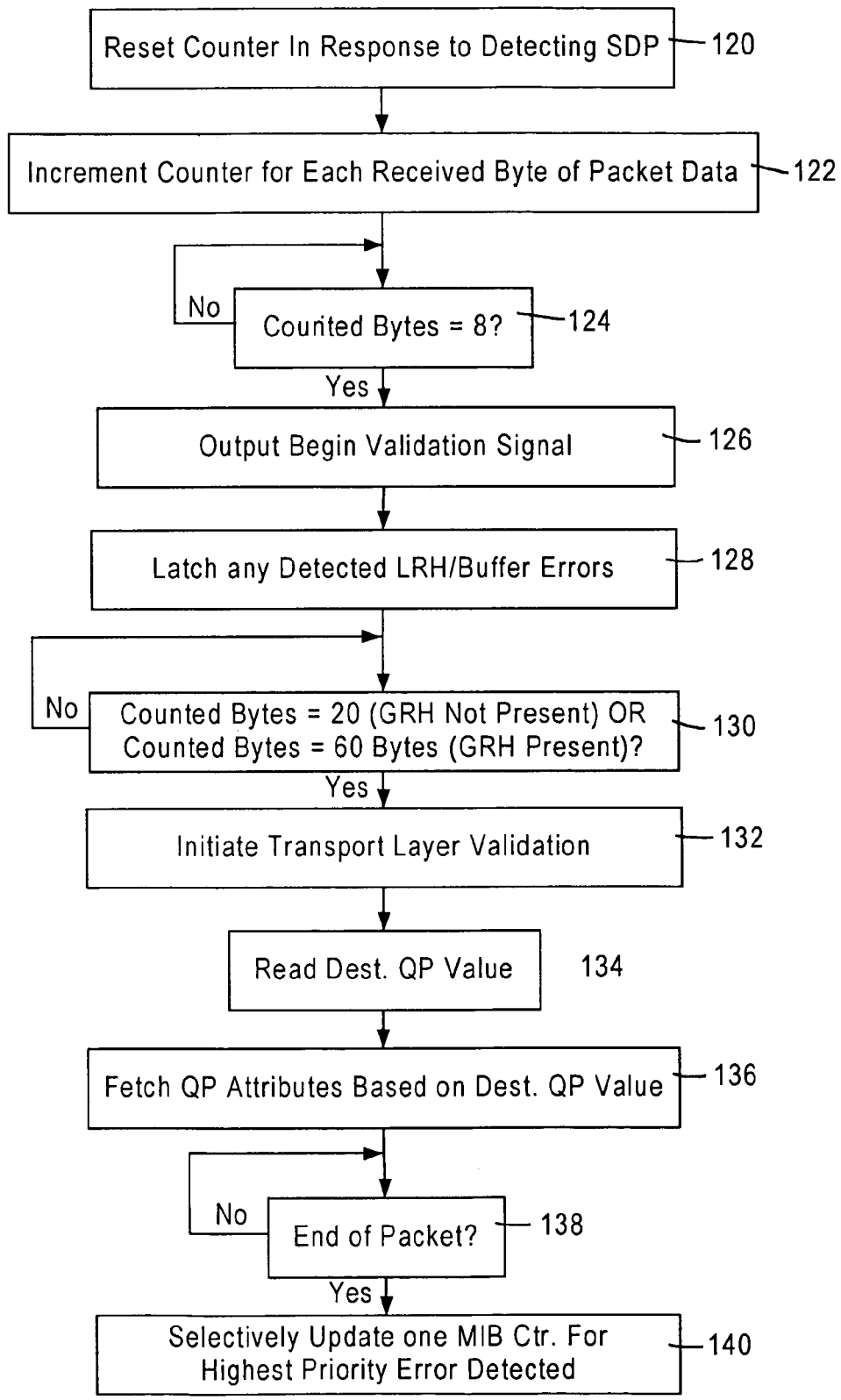
FIG. 4 is a diagram illustrating the method of initiating validation of the data packet based on receipt of the local route header and the base transport header, according to an embodiment of the present invention.

FIG. 4 is a diagram illustrating the method of validating a received data packet according to an embodiment of the present invention. The method begins in step 120, where the detector 72 resets the counter 70 in response to detecting a start data packet delimiter (SDP) from packet data received via the bus 38. The counter 70 increments in step 122 for each received byte of the data packet. If in step 124 the local route header detector 74 determines that the counter value equals 8 bytes, the local route header detector 74 outputs in step 126 the begin validation signal 78, causing the validation resource 76 to initiate validation of the received local route header. Any errors detected within the local route header are stored in step 128 into the respective latches 86, enabling the validation resource 76 to store the errors while awaiting the reception of the CRC field at the end of the data packet.

If in step 130 the transport layer receive resource 22 determines that the counter value output by the counter 70 equals 20 bytes and that a GRH is not present, or that the counter 70 equals 60 bytes if the GRH is present, the transport layer receive resource 22 initiates in step 132 transport layer validation, including reading the destination queue pair value 112 in step 134, and fetching the queue pair attributes in step 136 from the system memory 24 based on the destination queue pair value 112.

Upon reception of the end of the packet in step 138, the MIB arbitration module 90 selectively updates in step 140 one of the MIB counters 92 based on the relative priority of the detected errors.

According to the disclosed embodiment, validation of local routing headers and base transport headers can be effectively implemented while the data packet is received, minimizing latency that otherwise may be encountered while awaiting the end of the data packet, and thereby optimizing the throughput of the channel adapter.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a channel adapter, the method comprising:
    coupling a receive bus in the channel adapter to a network, including receiving by the receive bus a data stream from the network, the data stream including bytes of packet data for a data packet;
    resetting a counter in the channel adapter in response to detecting, in the data stream on the receive bus, a start data packet delimiter for the data packet;
    incrementing the counter for each received byte of the data packet as the corresponding byte is received on the receive bus;
    initiating packet validation in the channel adapter in response to the counter reaching a prescribed threshold corresponding to reception of an initial header of the data packet, the initiating step including determining whether the initial header includes any errors; and
    selectively reporting in the channel adapter one of the errors detected in the initial header, upon reception of an end of the data packet, based on a determined absence of a higher-priority error relative to the one error according to a prescribed error reporting order.

2. The method of claim 1, the initiating step includes detecting whether the counter reaches the prescribed threshold corresponding to reception of a local route header as the initial header.

3. The method of claim 2, wherein determining step includes:
    detecting whether an error exists for any one of a link version field, a packet length field, a destination local identifier field, a virtual lane field, a determined presence of a global route header relative to a prescribed virtual lane value in the virtual lane field, and a buffer availability in the channel adapter for the data packet;

storing the error, based on the detection thereof, during reception of the data packet.

4. The method of claim 3, wherein the selectively reporting step includes incrementing an error counter of the one error and corresponding to an error type for the stored error having a highest priority, based on a determined absence of a CRC error in the data packet upon reception of the end of the data packet.

5. The method of claim 2, further comprising:

detecting reception of a base transport header based on the counter reaching a second prescribed threshold corresponding to an end of the base transport header; and initiating transport layer validation, including retrieving queue pair information based on a queue pair value specified in the base transport header, upon reception of the base transport header and prior to reception of the end of the data packet.

6. A channel adapter comprising:

a receive bus in the channel adapter;

a link interface in the channel adapter and configured for coupling the receive bus to a network, the receive bus configured for receiving a data stream from the network, the data stream including bytes of packet data for a data packet; and a link receive resource in the channel adapter and having a counter configured for counting each received byte of the data packet as the corresponding byte is received on the receive bus, the link receive resource configured for resetting the counter in response to detecting in the data stream on the receive bus a start data packet delimiter for the data packet, and initiating packet validation for determining whether an initial header includes any errors in response to the counter reaching a prescribed threshold corresponding to reception of the initial header of the data packet, the link receive resource configured for selectively reporting one of the errors detected in the initial header, upon reception of an end of the data packet, based on a determined absence of a higher-priority error relative to the one error according to a prescribed error reporting order.

7. The channel adapter of claim 6, wherein the prescribed threshold corresponds to reception of a local route header as the initial header.

8. The channel adapter of claim 7, wherein:

the link receive resource is configured for detecting whether an error exists within the local route header for any one of a link version field, a packet length field, a destination local identifier field, a virtual lane field, a determined presence of a global route header relative to a prescribed virtual lane value in the virtual lane field, and a buffer availability in the channel adapter for the data packet; and the link receive resource includes latches for storing information identifying detection of any one of the respective errors in the local route header.

9. The channel adapter of claim 8, further comprising error counters for counting the respective errors, the link receive resource configured for incrementing one of the error counters of the one error and corresponding to an error type for the stored error having a highest priority, based on a determined absence of a CRC error in the packet upon reception of the end of the data packet.

10. The channel adapter of claim 7, further comprising a transport layer receive resource configured for detecting whether an error exists within a base transport header following the local route header, the transport layer receive resource configured for initiating transport layer validation, including retrieving queue pair information based on a queue pair value specified in the base transport header, in response to the counter reaching a second prescribed threshold corresponding to an end of the base transport header.

11. The method of claim 1, wherein the initiating includes initiating said packet validation before reception of an end of the data packet.

12. The channel adapter of claim 6, wherein the prescribed threshold is detected before the reception of the end of the data packet.

13. The method of claim 1, wherein the selectively reporting step includes incrementing an error counter of the one error in response to the one error corresponding to an error type having a highest priority relative to the errors detected in the initial header and according to the prescribed error reporting order.

14. The method of claim 13, wherein the channel adapter includes a plurality of said error counters for counting respective error types, the selectively reporting including identifying, by arbitration logic in the channel adapter, the one error having the highest priority, according to the prescribed error reporting order, from among the errors detected in the initial header.

15. The method of claim 14, wherein the determining includes:

detecting whether an error exists for any one of the error types of a link version field, a packet length field, a destination local identifier field, a virtual lane field, a determined presence of a global route header relative to a prescribed virtual lane value in the virtual lane field, and a buffer availability in the channel adapter for the data packet;

storing the error for the corresponding one error type, based on the detection thereof, during reception of the data packet.

16. The channel adapter of claim 6, further comprising a plurality of error counters for counting detected errors according to respective error types, the link receive resource configured for incrementing the corresponding error counter of the one error in response to the one error corresponding to the error type having a highest priority relative to the errors detected in the initial header and according to the prescribed error reporting order.

17. The channel adapter of claim 16, wherein the link receive resource includes arbitration logic configured for identifying the one error having the highest priority, according to the prescribed error reporting order, from among the errors detected in the initial header.

18. The channel adapter of claim 17, wherein the link receive resource is configured for:

detecting whether an error exists for any one of the error types of a link version field, a packet length field, a destination local identifier field, a virtual lane field, a determined presence of a global route header relative to a prescribed virtual lane value in the virtual lane field, and a buffer availability in the channel adapter for the data packet; and storing the error for the corresponding one error type, based on the detection thereof, during reception of the data packet.

* * * * *